United States Patent [19]

Tsai et al.

[11] Patent Number: 5,052,706
[45] Date of Patent: Oct. 1, 1991

[54] FOLDABLE BICYCLE

[76] Inventors: Duan-Huey Tsai; Shwu-Huey Tsai, both of No. 446, Chien-Kuo First Road, Kao-Hsung, Taiwan

[21] Appl. No.: 533,686
[22] Filed: Jun. 5, 1990
[51] Int. Cl.$^5$ ............................................. B62K 15/00
[52] U.S. Cl. ................................. 280/287; 74/594.7; 280/639; 280/278
[58] Field of Search ...................... 280/287, 278, 87.05, 280/639, 40; 74/594.7, 594.4

[56] References Cited

U.S. PATENT DOCUMENTS

| | | | |
|---|---|---|---|
| 3,374,009 | 3/1968 | Jeunet | 280/287 |
| 4,202,561 | 5/1980 | Yonkers | 280/278 |
| 4,895,386 | 1/1990 | Hellestam et al. | 280/278 X |

FOREIGN PATENT DOCUMENTS

| | | | |
|---|---|---|---|
| 1482367 | 4/1967 | France | 280/287 |
| 4656 | 12/1919 | Netherlands | 280/287 |
| 8701084 | 2/1987 | World Int. Prop. O. | 280/287 |

Primary Examiner—Richard A. Bertsch
Assistant Examiner—Paul Dickson
Attorney, Agent, or Firm—Notaro & Michalos

[57] ABSTRACT

A foldable bicycle which is characterized by a top bar of the main frame having two angled and pivotally connected sections allowing the front portion of the bicycle to be folded downwardly and backwardly toward the rear portion of the frame by a two-piece support bar provided between the main frame and the saddle pillar of the bicycle, which has a control lever to quickly separate the support bar for folding purposes, by a handle-bar stem having a locking mechanism at its lower portion which has a pulling arm for quickly controlling the bending or straightening of the handle-bar stem; and by a pair of pedals which may be turned inwardly due to a special connection thereof, the bicycle is easily folded.

5 Claims, 12 Drawing Sheets

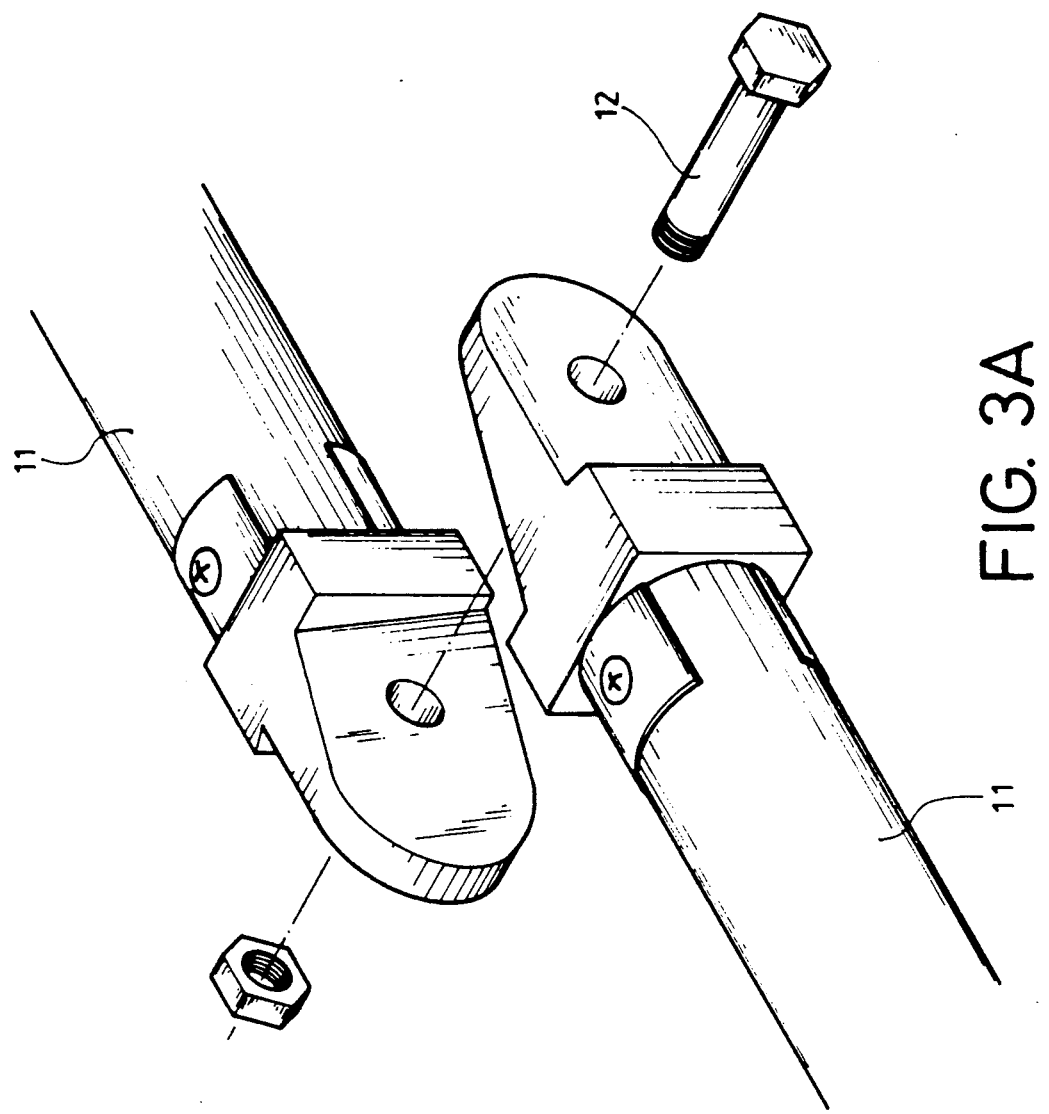

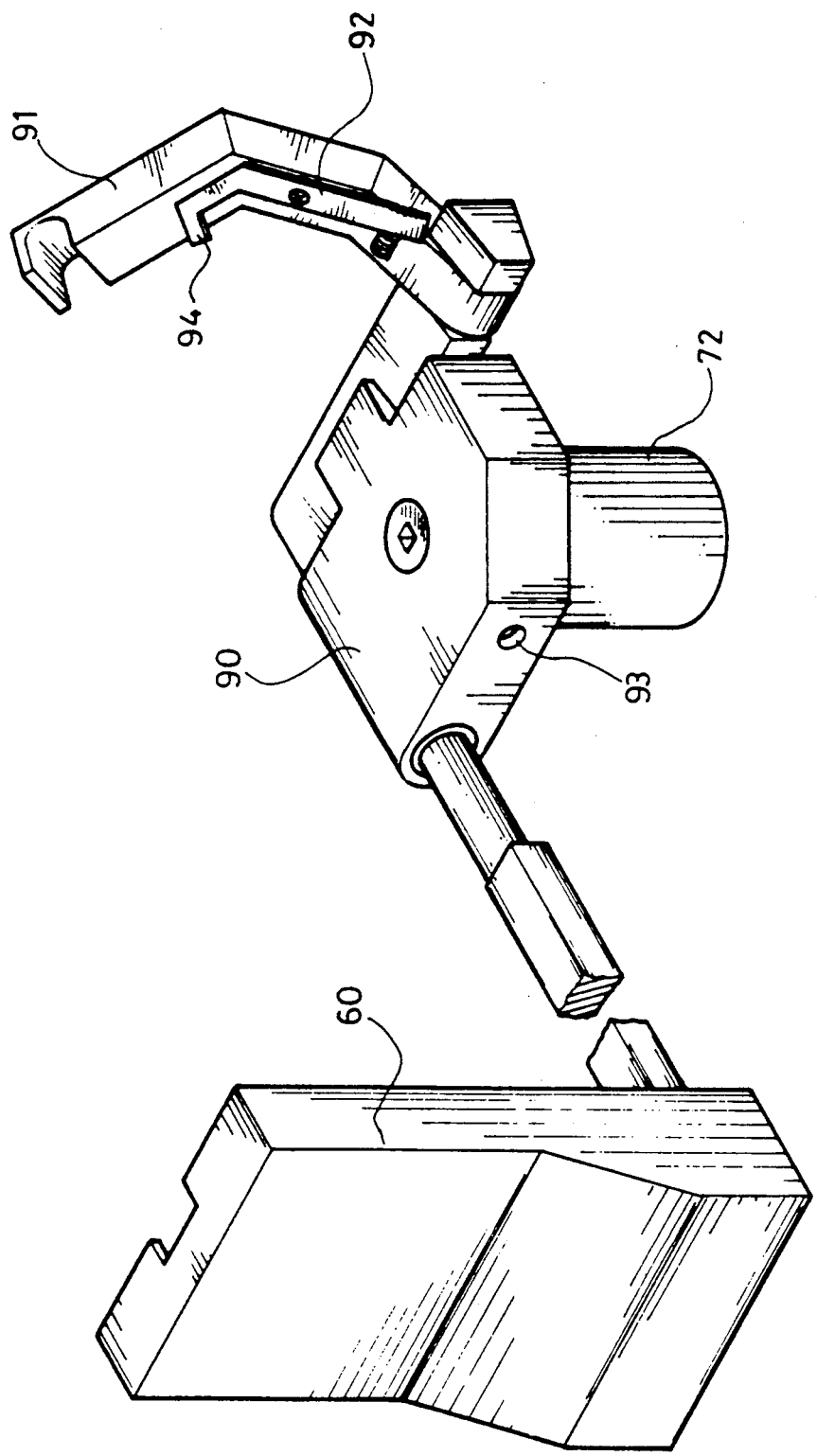

FOLDABLE BICYCLE

BACKGROUND OF THE INVENTION

The present invention relates to a foldable bicycle, particularly to an upwardly foldable bicycle which has a strong structure and is easy to use and convenient to fold.

Foldable bicycles are widely welcome due to their largely reduced volume when they are folded. However, there are still shortcomings in the conventional foldable bicycles which are worthy of some improvements.

Most of the conventional foldable bicycles are either downwardly or sidewardly folded which after a long period of use, might cause the bicycle to collapse or become loose due to natural mechanical degeneration. The applicant has therefore tried to develop a foldable bicycle which has a structure with increased joint stress by utilizing downward force from the rider's weight against the joint. Further, a crank set of 25 without projecting out of the bicycle frame. Moreover, the front wheel of the present invention is not necessarily the same size as the rear wheel but the two wheel may contact the ground in parallel while they are folded toward each other to facilitate carriage by the rider.

SUMMARY OF THE INVENTION

It is the primary object of the invention to provide a foldable bicycle which has a main frame that consists of two angled and rotatably joined sections so that the front portion of the bicycle may be folded to the rear and downwardly to form two parallel planes allowing the two wheels of the bicycle to contact the ground at the same time even though they have different sizes.

Another object of the invention is to provide a foldable bicycle which includes a locking mechanism for permitting a handle-bar stem of the bicycle to remain in an upright position. When folding the bicycle, a pulling arm of the locking mechanism is pulled to an open position for permitting the handle-bar stem to be pushed backwardly, turned, and folded easily.

A further object of the invention is to provide a foldable bicycle which includes a pair of pedals connected to a chain driving axle of the bicycle through a crank set. The pedals may be turned and folded without projecting out of the main frame so that the whole folded bicycle can be folded into a compact package.

Still a further object of the invention is to provide a foldable bicycle which includes a support bar provided between the top bar of the main frame and the saddle pillar of the bicycle. The support bar contains two sections, i.e. a front bar and a rear bar. A convenient structure is provided for folding the bicycle.

BRIEF DESCRIPTION OF THE DRAWINGS

Other objects and advantages of the invention will become apparent when referring to the following description and accompanying drawings wherein:

FIG. 3A is a three-dimensional perspective of FIG. 3, showing the assembly thereof;

FIGS. 6, 6A, and 6B illustrate the connection of the crank set and the chain driving axle of the invention.

DETAILED DESCRIPTION OF THE PREFERRED EMBODIMENTS

Figure 1:
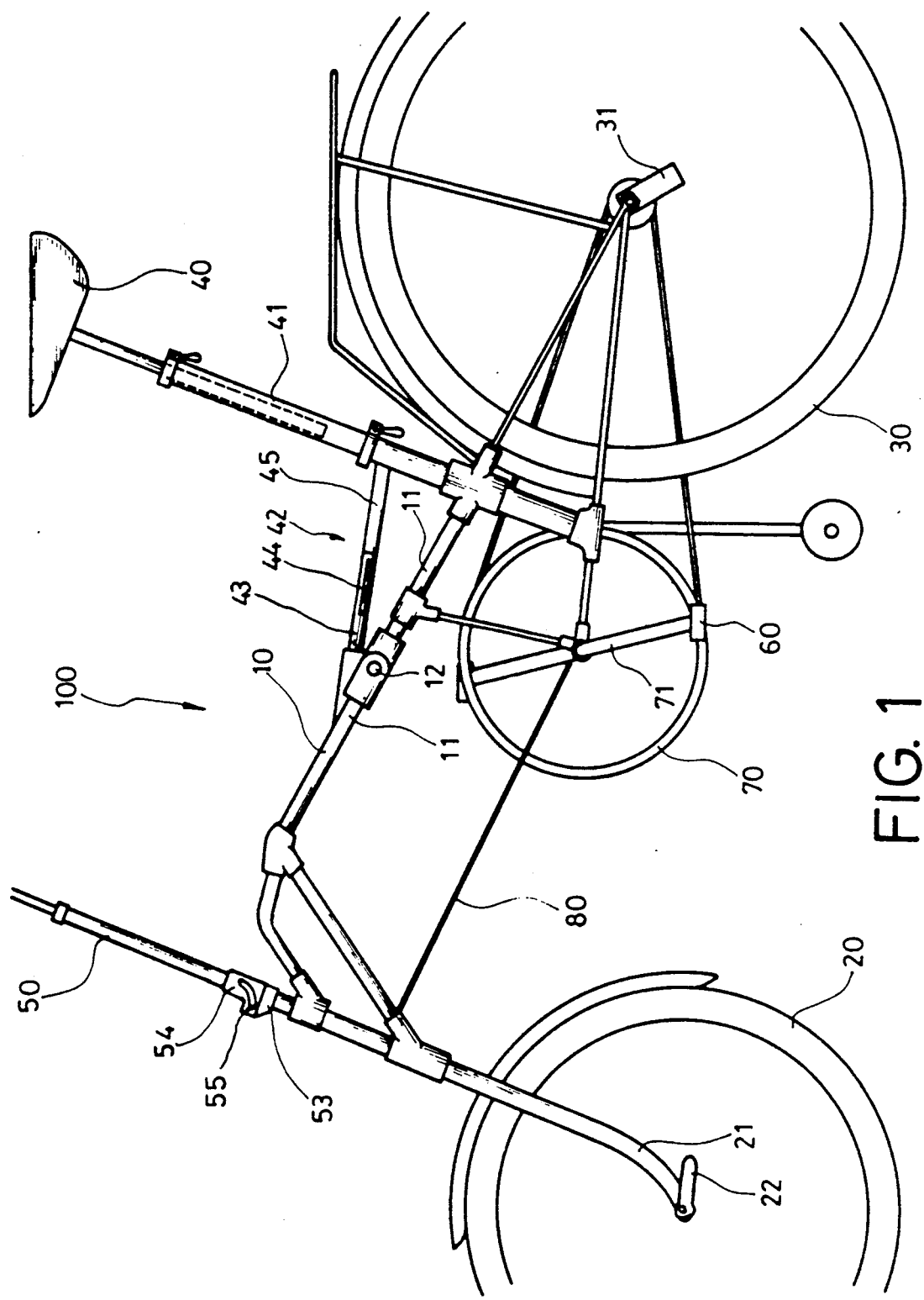
FIG. 1 illustrates a bicycle of the invention in an unfolded positon.

Referring to FIG. 1, the foldable bicycle 100 includes a main frame 10, a front wheel 20 connected to the front end of the main frame 10, a rear wheel 30 connected to the rear end of the main frame 10, a saddle 40 on top of a saddle pillar 41 connected to central portion of the main frame, a handle-bar stem 50 connected to the front upper end of the main frame 10, and a pair of pedals 60 connected to a crank set 71 of a front chain driving wheel spocket 70.

Figure 3:
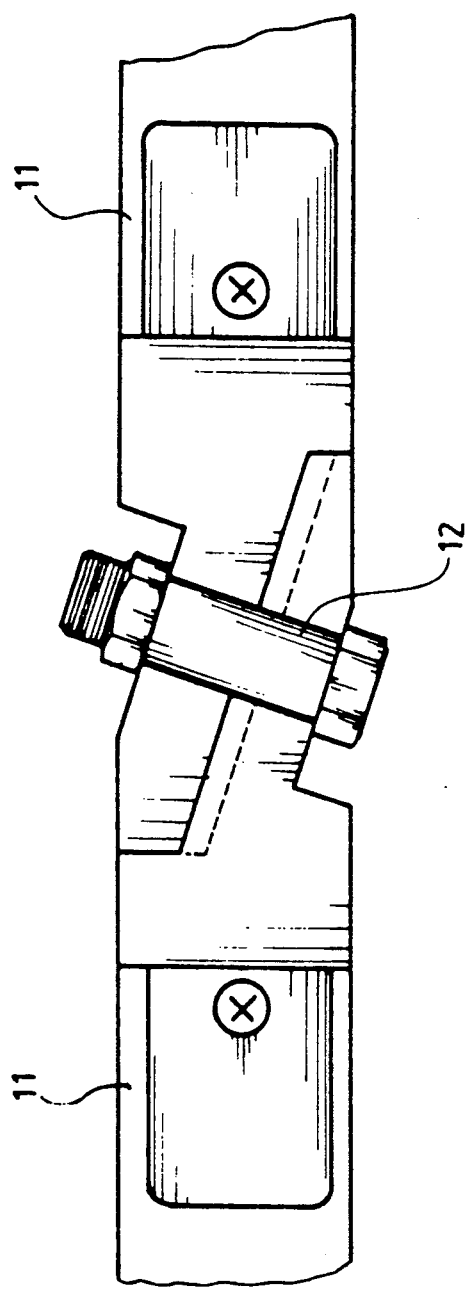
FIG. 3 is a fragmentary top view showing the angeled portion of the main frame of the invention.
Figure 3B:
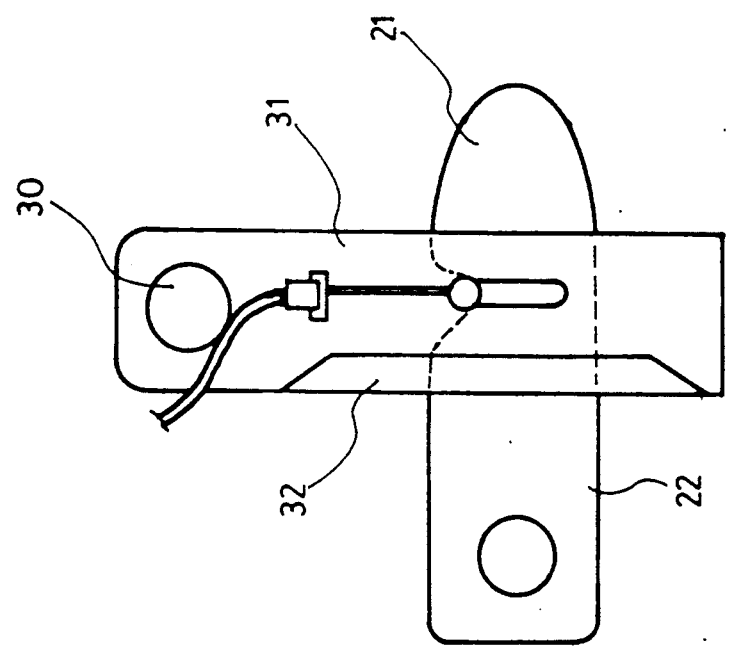
FIG. 3B illustrates the engagement of an insert slip on the front wheel to a receiving slip on the rear wheel when the bicycle of the invention is folded.

The main frame 10 further includes a top bar 11 which consists of two angled sections as shown in FIG. 3 and FIG. 3A. The two angled sections of the top bar 11 are pivotally joined by a pivot pin 12 thereby permitting the front poriton of the main frame 10, the front wheel 20, and the handle-bar stem 50 to turn at an angle toward one side of the rear wheel 30, i.e., when the bicycle 100 is folded, the front which is moved to the rear at an angle. The front wheel 20 has an insert slip 22 provided on the lower end of a fork 21 thereof, and the rear wheel 30 has a receiving slip 31 extended from a central axle of the rear wheel 30. As shown in FIG. 3B, the receiving slip 31 has an inserting opening 32 which is larger than the insert slip 22 for permitting the insert slip 22 to be received therein and thereby the backward folded front wheel 20 may be fixed to the rear wheel 30.

Figure 5A:
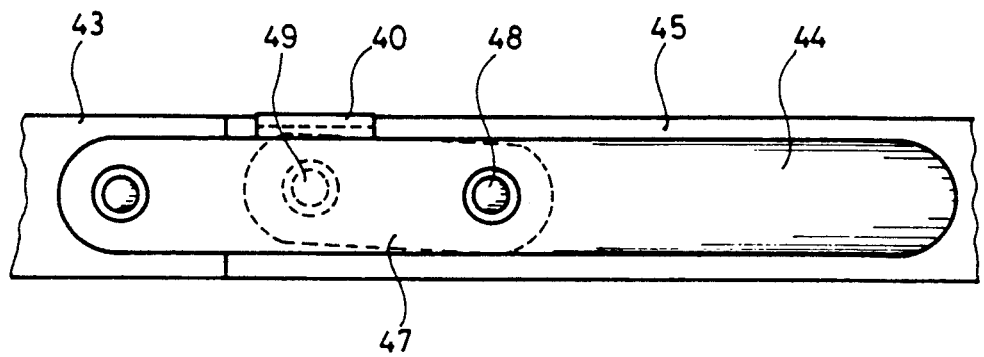
FIGS. 5, 5A, and 5B illustrate the structure and operation of the control lever on the support bar of the invention.
Figure 5:
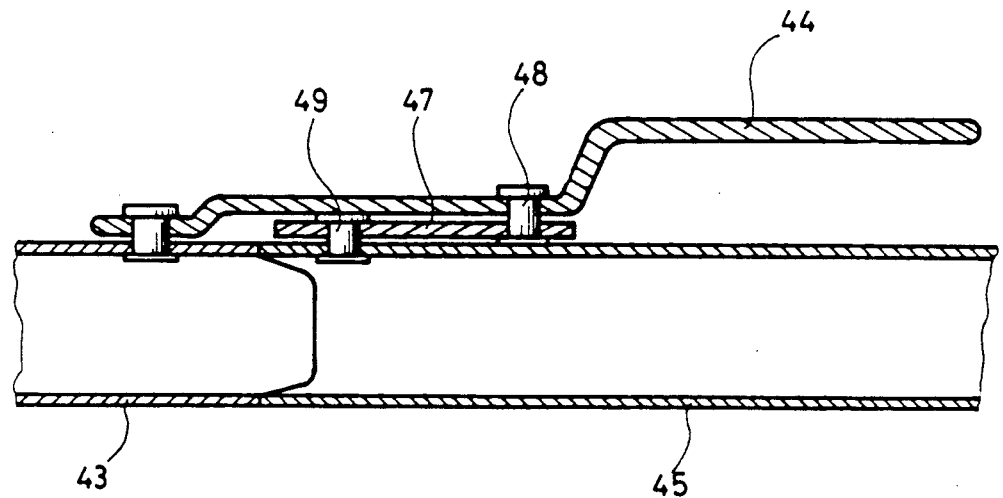
Figure 5B:
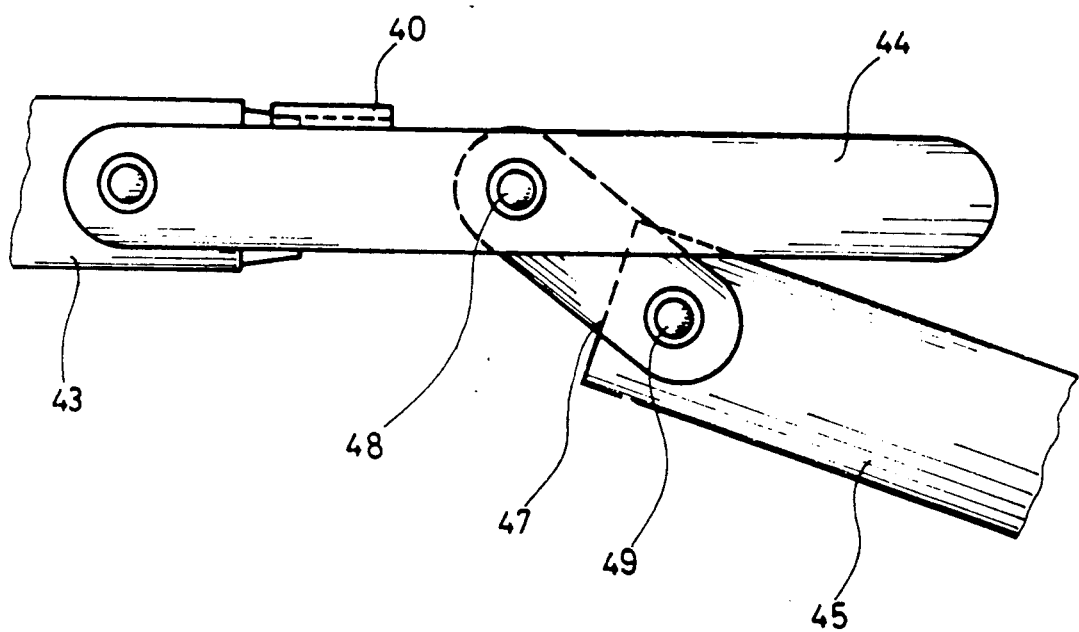

As shown in FIG. 1, a support bar 42 is provided between the saddle pillar 41 and the top bar 11 of the main frame 10. The support bar 42 consists of two sections, i.e. a front bar 43 and a rear bar 45. A convenient control lever 44 is provided on the front bar 43 near the joint of the front bar 43 and the rear bar 45. See FIG. 5 for the detailed folding structure of the support bar 42. The convenient control lever 44 is pivotally connected to a linking plate 47 at a pivot point 48 near the middle of the lever 44, the other end of the linking plate 47 is pivotally connected to a pivot point 49 on the rear bar 45. As shown in FIGS. 5, 5A, and 5B, when folding the support bar 42, front bar 43 can move downwardly and to the rear, separating from rear bar 45, due to the pivoting of lever 44 which rotate plate 47 about pivot points 49, 48. FIG. 5A is a side view of the unfolded bar 43 and 45 and FIG. 5B is the same view of the folded bars. To recover the unfolded position, simply do the reverse action, and the front and the rear bars 43, 45 will return to their straight connected position, and the linking plate 47 will form a slightly bias angle against the stopper 40.

Figure 4:
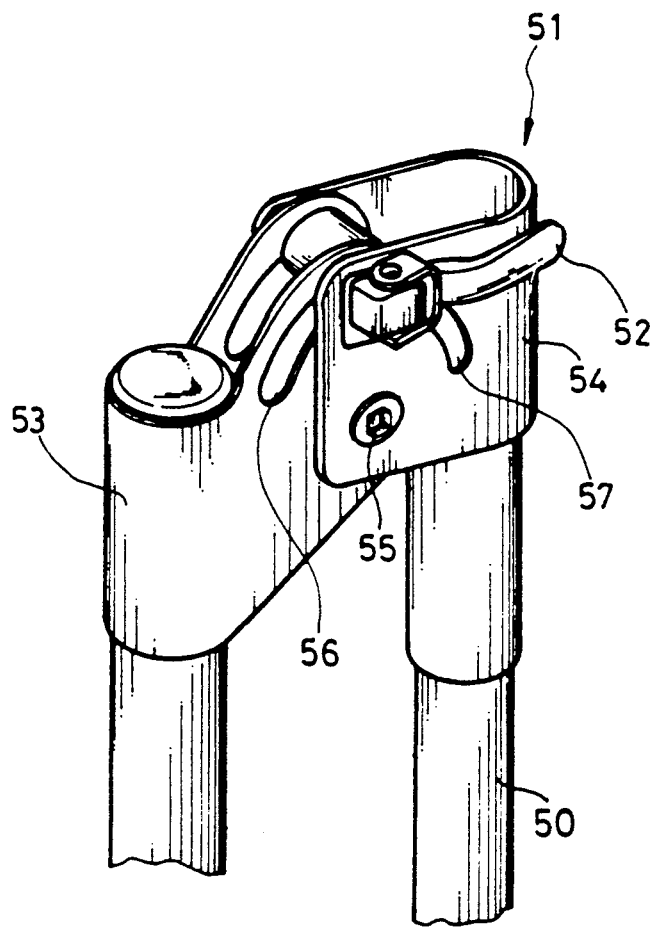
FIG. 4 is a three-dimensional perspective view showing the folding structure of the handle-bar stem of the invention.
Figure 4B:
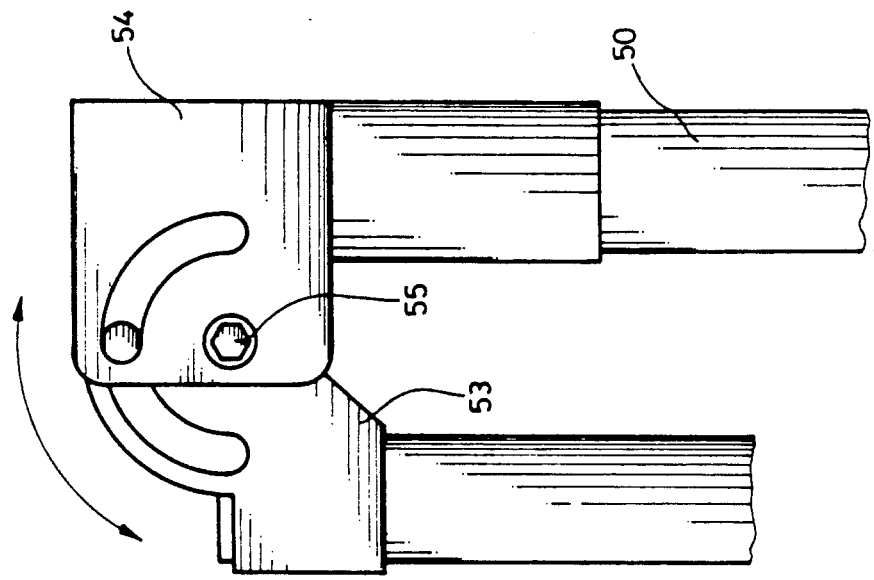
FIG. 4B is a fragmentary elevational view showing the handle-bar stem in a bent position.
Figure 4A:
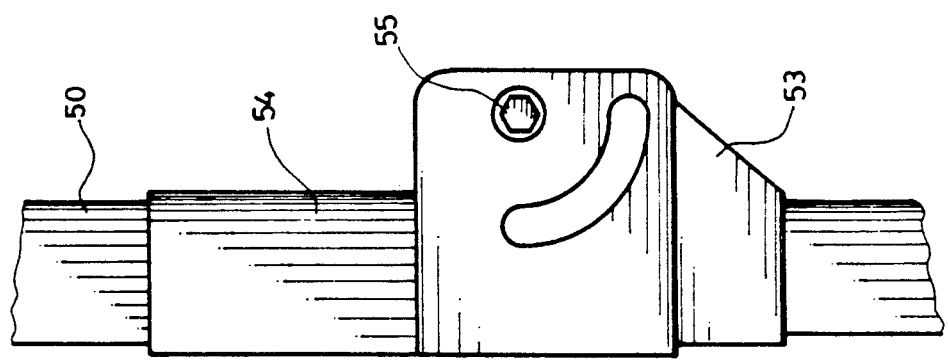
FIG. 4A is a fragmentary elevational view showing the locking means on the handle-bar stem when the handle-bar stem is in an upright position.

The handle-bar stem 50 is pivotally connected to the front end of the top bar 11 of the main frame 10 as shown in FIG. 1. A locking means 51 is provided on the handle-bar stem 50 near the pivot connecting point of the handle-bar stem 50 and the top bar 11. As shown in FIGS. 4, 4A and 4B, the locking means 51 further includes a pulling arm 52, a lower joint 53, and an upper joint 54. A pivot bolt 55 is used to pivotally connect the upper and the lower joints 54, 53. Substantially arcuate slots 56, 57 are formed on the lower and the upper joints 53, 54, respectively, at a corresponding position thereon, and, a pin connected to one end of the pulling arm 52 is transversely disposed in the arcuate slots 56, 57 to form another connecting point of the lower and the upper joints 53, 54. When the pulling arm 52 is pulled to an open position, the pin at its another end is allowed to freely, slidably move in the arcuate slots 56, 57 that facilitates the folding or unfolding of the handle-bar stem 50. To unfold and fix the handle-bar stem 50, simply pull the pulling arm 52 to a locked position.

The saddle 40 and the saddle pillar 41 employ telescopic tubes to provide easy turning, telescoping, and extending. Since this belongs to the prior known art, it is not discussed in details herein.

Further, a steel cord 80 is longitudinally provided between two ends of the main frame 10 to reinforce the load bearing of the bicycle 100 by its tension force. When the bicycle 100 is folded, the steel cord 80 becomes flexible and will not hinder the folding of the bicycle 100.

Figure 6:
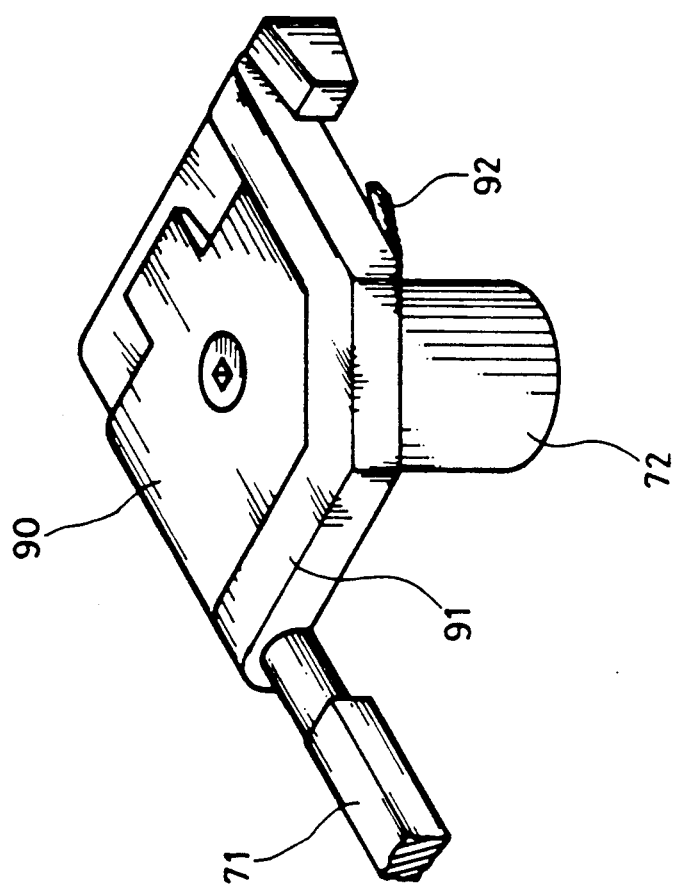
Figure 6B:
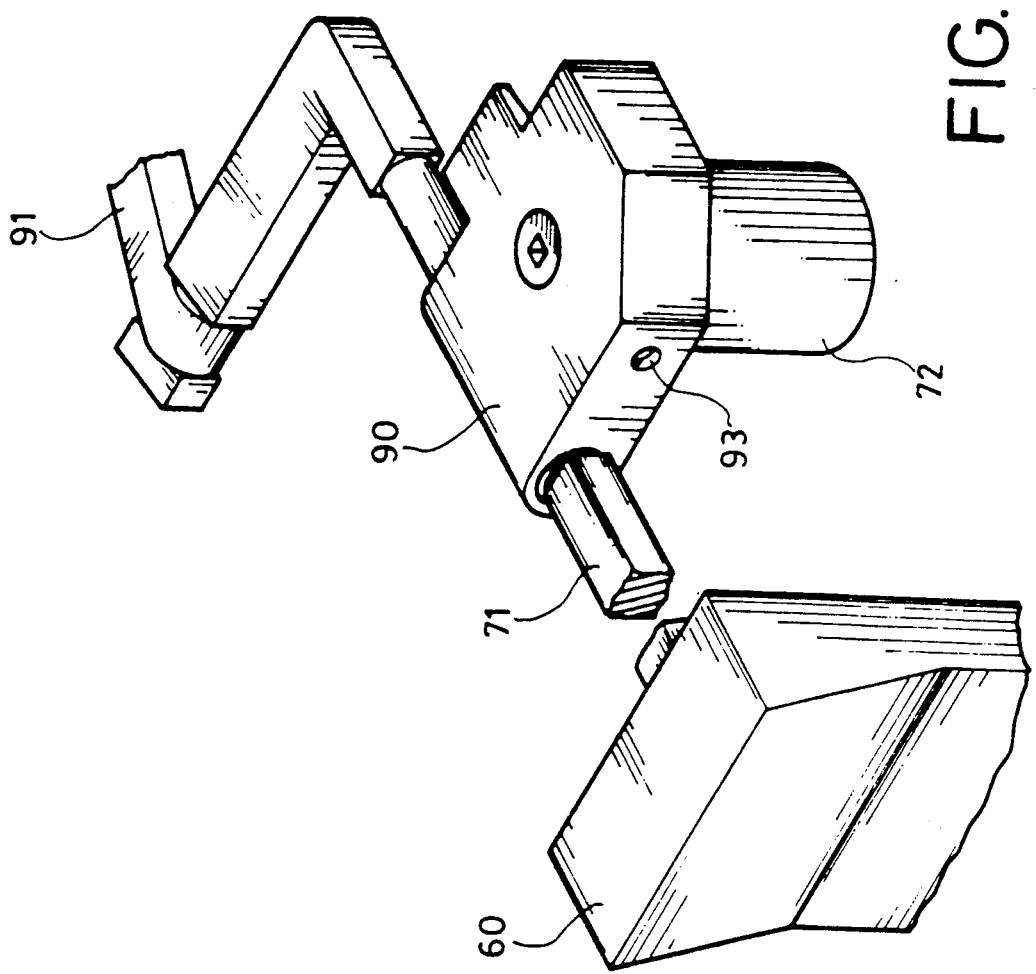

FIGS. 6, 6A, and 6B illustrate a preferred embodiment of the connecting structure of the crank set 71 and a chain driving axle 72. In this structure a fixing connecting piece 90 is mounted on the chain driving axle 72 while the L-shaped portion of the crank set 71 is telescopically connected to the fixing connecting piece 90 in a manner that it is normal to the chain driving axle 72 and is permitted to slidably move and turn in relation to the connecting piece 90. A retaining arm 91 is provided to retain the crank set 71 in its unfoled position as shown in FIG. 6. By depressing a control rod 92 connected pivotally below the retaining arm 91, the pillar 94 can separate from the hole 93 formed on the connecting piece 90 as shown in FIG. 6A. Thereby the crank set 71 can be turned and the pedals 60 will assume an inwardly pointing position.

Figure 2:
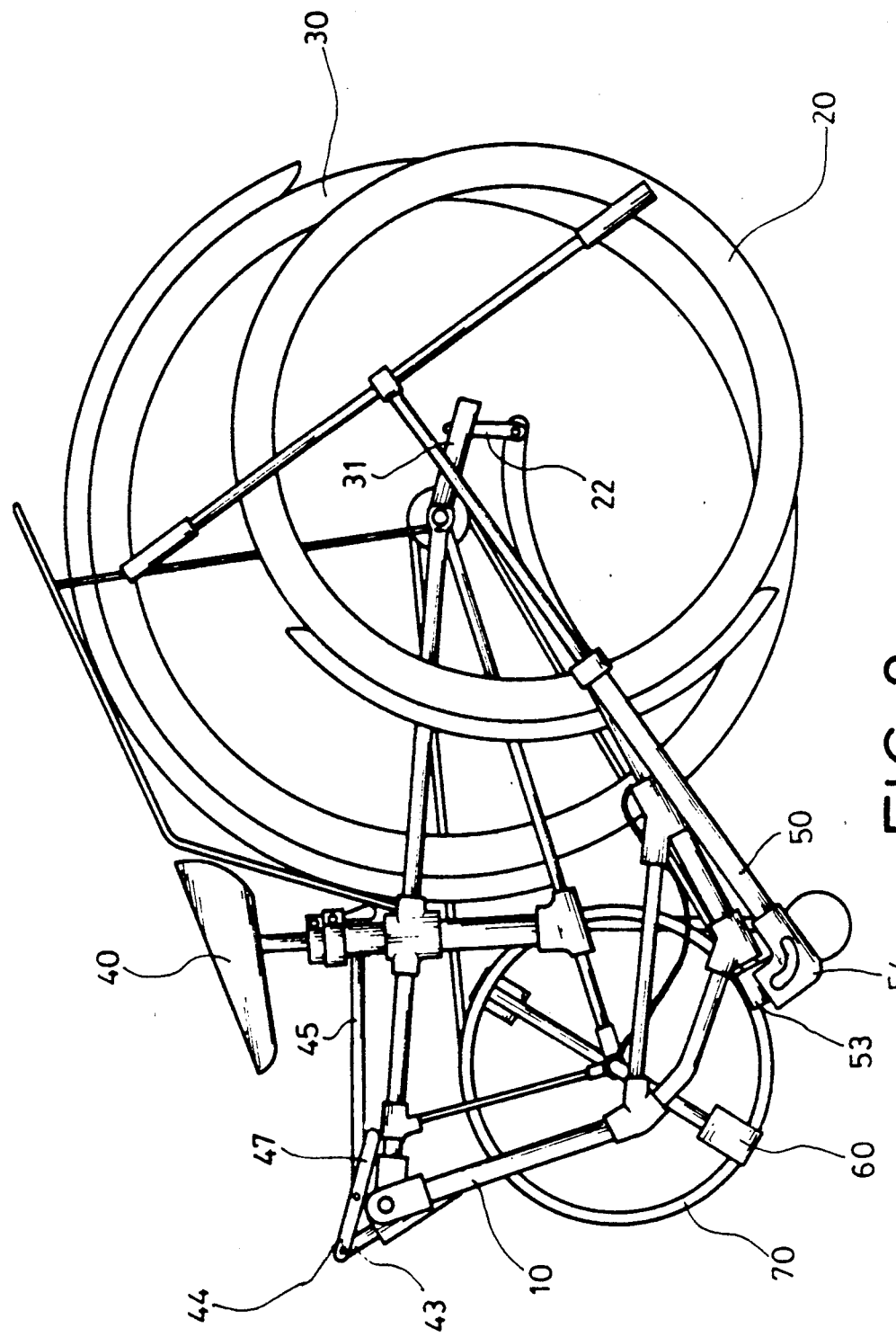
FIG. 2 illustrates a bicycle of the invention in a folded position.

In the folding operation as shown in FIG. 2, one first manipulates the convenient control lever 44 to permit the folding of the main frame 10, then pulls the pulling arm 52 to the OPEN position to allow the folding of the handle-bar stem 50, finally turning the handle-bar stem 50 to be parallel to the front wheel 20 while the pedals 60 may be easily turned toward the crank set 71. Since each operating step can be smoothly completed with one hand, the bicycle 100 may be quickly folded. After the main frame 10 and the handle-bar stem 50 are folded, the front wheel 20 may be turned toward the rear wheel 30 and be fixed there by engagement of the insert slip 22 on the front wheel 20 with the inserting opening 32 of the receiving slip 31 on the rear wheel 30. Since both wheels may contact the ground after they are folded toward each other, the folded bicycle 100 can be carried with more energy being saved, and, the two wheels are not necessarily designed to have the same size.

I claim:

1. A foldable bicycle comprising: a main frame with a top bar; a front wheel connected to a front end of said main frame; a rear wheel connected to a rear end of said main frame; a handle-bar stem connected to an upper portion of the front end of said main frame; a saddle pillar connected to a rear end of said top bar; a saddle on top of said saddle pillar; a front chain driving sprocket rotatably mounted below a middle portion of said main frame; a pair of pedals connected to opposite sides of said sprocket; said handle-bar stem and said saddle pillar being telescopically structured to facilitate their height adjustment; said top bar of said main frame consisting of two pivotally connected sections having an angled connection therebetween for permitting the front end of said main frame to pivot at an angle toward the rear end of said main frame so that said front and rear wheels can be placed in parallel positions; a support bar connected between said top bar and said saddle pillar; said support bar comprises of a front bar and a rear bar detachably engagable with said front bar; a control lever having one end pivotally connected to said front bar; a linking plate having one end pivotally connected to said rear bar; an opposite end of said linking plate being pivotally connected to a middle portion of said control lever so that said support bar is folded by pivoting said control lever and said linking plate to disengage said front bar from said rear bar, said control lever and linking plate being pivoted to an aligned position for engaging said front bar with said rear bar.

2. A foldable bicycle as claimed in claim 1 wherein said handle-bar stem includes locking means which further includes a pulling arm, a lower joint, and an upper joint; said lower and said upper joints being pivotally connected to a pivot bolt and having generally arcuate slots formed on them at a corresponding position to allow a pin on said pulling arm to transversely cross therethrough; said pulling arm being pulled to an open or a locked position to separately control the bending or straightening of said handle-bar stem.

3. A foldable bicycle as claimed in claim 1 wherein said front wheel has a front fork, on a lower end of which an insert slip is provided; said rear wheel has a receiving slip which is extended from a central axle of said rear wheel and has an inserting opening for receiving said insert slip on said front wheel so that said front wheel can be fixedly held on to said rear wheel when said bicycle is folded.

4. A foldable bicycle as claimed in claim 1 wherein a steel cord is further provided between two ends of said main frame to reinforce the strength of said main frame.

5. A foldable bicycle as claimed in claim 1, including a chain driving axle connected to said sprocket, a connecting piece connected to opposite sides of said sprocket, a crank set rotatably and slidably mounted in each connecting piece, one of said pair of pedals connected to each crank set, a retaining arm pivotally mounted to each connecting piece movable into an engaging position for engaging each crank set for precluding axial movement and rotation of each crank set, a control rod pivotally connected to each retaining arm and engagable into a hole in each connecting piece for holding said retaining arm in engagment with each crank set, said control rod being movable to disengage said hole and permit pivotal movement of said retaining arm for releasing said crank set for axial movement and rotation with respect to said connecting piece for folding said pedals.

* * * * *